United States Patent Office 3,232,708
Patented Feb. 1, 1966

3,232,708
METHOD OF PRODUCING MAGNESIUM HYDROXIDE HAVING VARIABLE PARTICLE SIZES
Harry Edward Chisholm, Fremont, Calif., assignor to FMC Corporation, New York, N.Y., a corporation of Delaware
No Drawing. Filed Sept. 28, 1962, Ser. No. 227,034
2 Claims. (Cl. 23—201)

This invention relates to the production of magnesium hydroxide having variously sized particles when produced by the reaction of lime or dolime with sea water-derived solutions containing a soluble magnesium halide, whereby MgO of controlled particle size can be produced.

Magnesia (MgO) may be produced by the calcination of an ore such as magnesite. However, sea water-derived magnesia is a higher quality material. One of the problems which has arisen in the production of magnesium hydroxide from sea water is the difficulty in obtaining controlled particle sizes which is essential for almost all its uses. This, in turn, is due to the fact that, in general, the magnesium hydroxide which is formed by mixing magnesium chloride-containing solutions with lime or dolime is a fine floc having a random particle sized distribution.

It is desirable to control the particle size of the magnesium hydroxide, since the grade of MgO which is obtained by calcining the magnesium hydroxide is correlated to the size of the particle entering the calciner. Different grades of magnesia (MgO), each having different physical properties, are obtained upon calcination of magnesium hydroxides having different particle sizes because the large particle sizes have a physical structure which differs from magnesium hydroxide having small particle sizes. Accordingly, a difference in the size of the magnesium hydroxide particle which is precipitated reflects a change in the properties of the particle which is not merely a function of size. Control of the particle size of the $Mg(OH)_2$ permits the controlled production of various grade of magnesia for a multitude of commercial uses.

One method for sizing these particles to give fractions having varying characteristics is taught in U.S. Patent 2,703,273, issued to James 'Allen Robertson et al. on March 1, 1955. However, this process does not attempt to control the size of the precipitated magnesium hydroxide product. It merely separates the existing fine particles into variously sized fractions.

Another problem which has arisen in the production of magnesium hydroxide derived from sea water or bitterns is the relatively long time required for the magnesium hydroxide sludge to separate from the solution. This is due to the relatively fine floc and low settled density which results when ordinary magnesium chloride solutions and the lime or dolime are merely reacted together. Reduction of the settling time is commercially advantageous in order to reduce the size and cost of the large settling tanks which are presently required to permit recovery of the fine $Mg(OH)_2$ precipitate.

It is an object of the present invention to control the size of magnesium hydroxide particles produced by reacting magnesium solutions and either dolime or quicklime so that a coarse, large particle sized fraction having a rapid settling rate can be obtained in addition to a fine particle sized fraction of high purity.

This and other objects will become apparent from the following disclosure.

It has now been found unexpectedly that the size of magnesium hydroxide particles can be controlled by mixing a magnesium halide-containing solution with either quicklime or dolime in amounts sufficient to react with from about 10% to 90% of the magnesium values contained in the magnesium halide solution in the presence of a soluble boron salt in amounts sufficient to supply from 20 to 500 mg. of boron per liter of such solution, precipitating a coarse $Mg(OH)_2$ initial fraction, separating this coarse magnesium hydroxide sludge from the resultant supernatant magnesium halide solution, reacting the resultant supernatant solution with additional amounts of quicklime or dolime up to about 95 to 99% of the stoichiometric amount required to react with the remaining magnesium values, precipitating an additional magnesium hydroxide product fraction in the presence of less boron than was present in the initial precipitation, this fraction having a finer particle size than the initial coarse fraction of magnesium hydroxide, and separating the finer $Mg(OH)_2$ fraction from the mother liquor substantially reduced in magnesium values.

The reason for the larger particle size of the initially precipitated magnesium hydroxide product, as compared with the latter $Mg(OH)_2$ fraction, is the presence of the given amount of soluble boron in the solution during the initial precipitation. The soluble boron and other impurities are removed from the solution along with the initial $Mg(OH)_2$ precipitate, permitting the fine $Mg(OH)_2$ fraction to be precipitated in the supernatant liquor in the absence of substantial amounts of soluble boron and other impurities normally found in the solutions. By increasing the concentration of the boron solution, the particle size of the initially precipitated magnesium hydroxide fraction becomes coarser. This increased particle size reaches a leveling off effect when the concentration of the boron reaches about 500 milligrams per liter of solution. The initial coarse fraction of $Mg(OH)_2$ which is recovered has been found to contain sizable amounts of boron and iron derived from the bitterns and impurities derived from the dolime. This grade of $Mg(OH)_2$, upon calcination to MgO, is suitable as an example, for use in magnesium oxychloride cements. The fine fraction of $Mg(OH)_2$ contains substantially reduced amounts of boron, iron or other impurities derived from the bitterns, in contrast to the coarse fraction. In addition, the major impurities derived from the dolime such as $Fe_2O_3$, $SiO_2$, $Al_2O_3$, and unreacted CaO can be separated readily from the fine fraction of $Mg(OH)_2$ by a simple sizing operation, e.g. cyclone separator, to yield a purer grade of magnesia than could be produced otherwise. Separation is facilitated by the coarseness of the dolime-derived impurities compared with the finer $Mg(OH)_2$ precipitate. This finer grade of sized $Mg(OH)_2$, upon being calcined to MgO, is suitable for use as a higher purity chemicma grade MgO.

A two-stage operation which is the preferred embodiment, is carried out as follows: Dolime or quicklime is added to a magnesium salt solution containing a water soluble boron salt in amounts sufficient to supply from about 20 to about 500 milligrams of boron per liter of solution. The amount of dolime or quicklime which is added is substantially less than the stoichiometric equivalent of calcium oxide required to act with all the magnesium in solution. The quantity of dolime or quicklime which is reacted in the first stage of the process will be determined by the desired degree of coarseness of the primary magnesium hydroxide sludge and by the boron content of the magnesium salt solution. It can be added in amounts sufficient to react with from between 10% to 90% of the magnesium values contained in the magnesium solution although it is preferred that enough be added so that only about 50% of the magnesium ion contained in the magnesium solution be precipitated in the first stage. Upon separation of the magnesium hydroxide sludge from the supernatant liquor containing soluble magnesium values, the supernatant liquor is reacted with additional quantities of quicklime or dolime in amounts to precipitate all but about 1 to 5% of the magnesium values in the magnesium halide solution.

The resulting magnesium hydroxide, precipitated in the second stage, has a much finer particle size than the initially precipitated magnesium hydroxide product. All of the remaining magnesium ions in the magnesium halide solution are not precipitated in the second stage in order to allow the calcium oxide in the dolime or quicklime to react so that magnesium hydroxide is precipitated with as little calcium contamination as possible.

The magnesium-containing solution employed can be sea water, bitterns or any other solution containing recoverable magnesium values. "Bitterns" are generally mother liquor left after evaporation of sea water or brines for the recovery of common salt. These solutions often contain residual sodium chloride and sulfate salts. It is usually advantageous to treat the bitterns with an excess of a soluble calcium salt to remove the sulfate values as the relatively insoluble calcium sulfate. The resultant solution is termed "$MgCl_2$ bitterns" and is more desirable than the raw bitterns since it contains less impurities to contaminate the final product. These "$MgCl_2$ bitterns" generally contain about 40 to 200 grams of $MgCl_2$ per liter of solution.

The boron compounds which have been found operable are water soluble boron salts. The boron salts all have the same effect regardless of the particular salt employed so long as they can be dissolved in the aqueous magnesium-containing solution. Pure and commercial grades of compounds such as boric acid, sodium perborate, borax, boric oxide and boric anhydride have all been found suitable. The boron compound must be present in the solution, when magnesium hydroxide is precipitated, in amounts to supply from about 20 to 500 milligrams of boron per liter of solution. Amounts lower than about 20 milligrams of boron per liter may be employed, but the particle size of the precipitated $Mg(OH)_2$ is increased only slightly. Amounts over 500 milligrams of boron per liter can be employed. However, these higher amounts are not effective in increasing the particle size of the $Mg(OH)_2$ beyond that obtained by solutions containing boron in amounts up to 500 milligrams per liter.

Although either quicklime or dolime can be employed for reaction with the magnesium halide-containing solution, dolime is generally preferred. "Dolime is the term applied to dolomite having a calcium to magnesium mole ratio of about 1, or to dolomitic limestone which is a naturally occurring mixture of limestone and either dolomite and magnesite or both, having a calcium to magnesium mole ratio greater than unity, which has been calcined so as to be essentially free of residual $CO_2$ and in which the CaO is in a reactable state. Quicklime is the term applied to the reactable product obtained by calcining materials which are composed primarily of calcium carbonate, such as limestone, the shells of mollusks, etc. Dolime is preferred because in addition to calcium oxide, it also contains magnesium values which are usually recovered along with the magnesium values present in the sea water, bittern, or other magnesium-containing solution.

This two-stage process for producing magnesium hydroxide is advantageous because it allows the production of essentially two size ranges of magnesium hydroxide particles, the second magnesium hydroxide sludge always having finer particles than the initially precipitated magnesium hydroxide sludge. Further, the size of the particles of magnesium hydroxide which are initially precipitated can be controlled by regulating the amount of boron which is added to the solution in which the magnesium hydroxide precipitates. Large amounts of boron, on the order of 100 to 500 mg./l., have been found to produce extremely large particles. In addition, if the amount of dolime or quicklime which is added is progressively reduced in the initial reaction stage, the coarseness of the resulting magnesium hydroxide sludges will progressively increase to a limiting value when the amount of dolime or quicklime corresponds to about 10 to 15% of the magnesium ion contained in the magnesium halide solution.

The greatest difference in degree of coarseness between the primary and secondary sludges is obtained when approximately one quarter to one half the magnesium ions contained in the magnesium halide solution is precipitated in the primary reaction, and essentially all of the remaining magnesium ions are precipitated in the secondary step. However, significant contrasts in sizes between the primary and secondary sludges are obtained when 20% to 90% of the magnesium ions are precipitated in the primary reaction and essentially all of the remaining magnesium ions are precipitated in the secondary reaction.

The difference in particle size between the primary and secondary reaction mixtures can only be brought about by the inclusion of sufficient soluble boron compound to affect the size of the magnesium hydroxide particle. If little or no soluble boron is present, the two-stage addition of dolime or quicklime does not result in the production of primary and secondary magnesium hydroxide products having significantly different particle size distributions. Instead, only a uniform size distribution of particles is obtained which is essentially the same in both the primary and secondary sludges.

The present process can be carried out continuously using separate reactors and settling tanks. On the other hand, if storage for the partially spent liquor is provided, the two magnesium hydroxide sludges can be prepared in the same equipment by sequential reactions and separations.

One method for measuring the relative sizing of the magnesium hydroxide sludge is to determine its "fineness modulus." The "fineness modulus" is defined as the sum of each of the cumulative weight percent retained by each sieve in a series of filter sieves divided by the number of sieves in the series. Thus, in comparing two sludges, the one with the higher "fineness modulus" will be the coarser. As used in the specification and examples, the "fineness modulus" is based on the Tyler Standard of Sieves having the following sieve numbers: 28, 32, 48, 65, 100, 150, 200, and 325.

While the process has been described with reference to the preferred embodiment, namely, a two-step precipitation, it is considered that the present process is readily adaptable to the production of an initial coarse fraction and two or more finer fractions of $Mg(OH)_2$. This can be carried out by precipitating an initial $Mg(OH)_2$ coarse fraction as described above, and separating the precipitate from the supernatant liquor. Sufficient lime or dolime is then added to the supernatant liquor to precipitate a first fine fraction in a liquor which contains less boron than was present when the coarse fraction was precipitated. However, this lime or dolime is added in amounts to react with only a portion of the remaining magnesium values in the liquor. The fine fraction is separated from its supernatant liquor and additional lime or dolime is added to the supernatant liquor to recover a second fine fraction of $Mg(OH)_2$ in the presence of less boron than was present when either the coarse fraction or the first fine fraction was precipitated. By this means, and by subsequent size separations, fine fractions of increasing chemical purity can be obtained, which upon calcination to MgO, yield magnesias of varying chemical purity and sizes.

This multi-step operation can readily be carried out where large quantities of boron are present in the original magnesium halide solution. In such cases, the residual supernatant liquor separated from the initial coarse precipitate would contain sufficient boron to permit varying grades of magnesium hydroxide in subsequently precipitated $Mg(OH)_2$ fractions. Magnesia products derived from these different grades of magnesium hydroxide precipitates would have varying properties, enabling them to be more readily accepted for "special uses" in which general purpose magnesias have not been found acceptable.

The following examples are given by way of illustration only and are not deemed to be limiting to the invention.

EXAMPLE I

Milled dolime was reacted with a $MgCl_2$ bittern solution containing naturally derived soluble boron. The $MgCl_2$ bittern was sulfate-free and derived from the solar evaporation of sea water. It contained 73 g. $MgCl_2$/l., 23 g. $CaCl_2$/l., 72 g. NaCl/l., 19 g. KCl/l., and 0.065 g. B/l. The dolime had a fineness modulus of 25 and was added in two stages. Enough dolime was added so that 47% of the $Mg^{++}$ contained in the bittern was precipitated as $Mg(OH)_2$ in the primary stage. After separating the partially spent liquor from the sludge, sufficient dolime was added in the second stage of the reaction to precipitate 99% of the $Mg^{++}$ remaining in the partially spent liquor. The coarse, primary sludge and the fine, secondary sludge were maintained in separate vessels for washing and further treatment. In each stage of the process, the reaction between the dolime and the solution was caused to occur by a continuous, gentle agitation of the suspension of solid particles for a period of six hours, followed by a settling period. After settling for 16 hours, the spent liquor was separated from the settled sludge and the sludge was repulped to a uniform dispersion. The solids content of the sludge (settled density) was determined by dissolving a measured volume in an excess of a standard 5 normal HCl solution in the presence of approximately 2 g. $NH_4Cl$, then titrating the excess acid to the endpoint of a suitable indicator such as Methyl Orange modified by Xylene Cyanole with a standard 1 normal NaOH solution.

The particle size distribution of the sludge was determined by pouring a measured volume of known solids content into a nest of sieves, then washing the material through the screens with a gentle stream of water until the effluent was free of turbidity. The amount of $Mg(OH)_2$ retained by each sieve was determined by acidimetrically, and expressed as a weight percent of that contained in the sample used for the test. The particle size distribution, fineness modulus, and settled density are given in Table 1.

| Percent Sludge Retained, Cumulative | Coarse Primary Sludge | Fine Secondary Sludge |
|---|---|---|
| 28 Tyler Mesh | 1.5 | 0.8 |
| 32 | 2.7 | 1.5 |
| 48 | 11.6 | 7.9 |
| 65 | 20.2 | 13.2 |
| 100 | 25.5 | 16.1 |
| 150 | 52.5 | 18.9 |
| 200 | 61.7 | 19.3 |
| 325 | 75.6 | 20.1 |
| Fineness Modulus | 31.4 | 12.2 |
| Settled Density, $Mg(OH)_2$ g./l. | 398 | 292 |

EXAMPLE II

A series of runs was made in which the total amounts of dolime which were added were distributed between a primary and a secondary reaction in weight proportions of 75/25, 50/50, and 25/75. Additionally, a run was made in which all of the dolime was reacted in a primary step with no subsequent secondary step (i.e., a dolime distribution of 100/0). These runs were carried out as follows: sulfate-free bittern derived from the solar evaporation of sea water, and containing 73 g. $MgCl_2$/l., 23 g. $CaCl_2$/l., 72 g. NaCl/l., 19 g. KCl/l., and 0.065 g. B/l. was reacted in two stages with dolime milled to pass a 20 mesh sieve and having a fineness modulus of 25. The proportions of dolime and bittern were selected so that a total of 95% of the $Mg^{++}$ contained in the bittern would be precipitated as $Mg(OH)_2$ cumulatively in the primary and secondary reactions. It was calculated that 212 g. of dolime would be required for reaction with 3 liters of bittern in order to precipitate 253 g. of $Mg(OH)_2$, including that obtained from the hydration of the MgO values of the dolime. The 212 g. of dolime which was to be added was then divided into the two portions as tabulated in Table 2. One portion was dispersed in the bittern and the suspension of $Mg(OH)_2$ which resulted was agitated for a period of six hours. The slurry was then permitted to settle for approximately 16 hours with the formation of predominantly coarse primary $Mg(OH)_2$ sludge and a clear liquid containing reduced concentrations of $Mg^{++}$ and boron. The partially spent liquor was separated from the sludge. The remaining portion of the dolime was added to precipitate a second $Mg(OH)_2$ sludge. This was treated in the same manner as the primary sludge product. The particle size distributions and the settled densities of the sludges for each of the runs were determined in the manner described in Example I. The results are tabulated in Table 2.

Table 2

| Reaction Stage—Dolime Distribution 100/0 | Primary | | | | Secondary | | |
|---|---|---|---|---|---|---|---|
| | | 75/25 | 50/50 | 25/75 | 75/25 | 50/50 | 25/75 |
| Reacting Solution, mg. B/l | 64.7 | 64.7 | 64.7 | 64.7 | 7.8 | 8.4 | 19.0 |
| Decanted Solution, mg. B/l | 4.0 | 7.8 | 8.4 | 19.0 | 2.2 | 0.6 | 2.2 |
| Sieve Analyses of Sludge, percent retained, cumulative: | | | | | | | |
| 28 mesh | 1.4 | 1.9 | 3.7 | 11.7 | 1.3 | 0.6 | 1.1 |
| 32 | 2.3 | 3.3 | 5.6 | 14.8 | 2.3 | 1.2 | 2.1 |
| 48 | 5.3 | 8.7 | 12.7 | 22.6 | 7.4 | 5.4 | 5.9 |
| 65 | 8.3 | 14.9 | 20.0 | 29.9 | 12.9 | 7.8 | 7.1 |
| 100 | 15.7 | 25.3 | 31.8 | 40.0 | 14.2 | 9.2 | 9.7 |
| 150 | 25.1 | 37.1 | 43.5 | 50.8 | 16.3 | 12.1 | 12.9 |
| 200 | 32.9 | 46.9 | 53.9 | 59.1 | 17.6 | 14.6 | 17.5 |
| 325 | 41.4 | 58.2 | 65.2 | 66.8 | 21.2 | 17.5 | 25.2 |
| Fineness Modulus | 16.6 | 24.5 | 29.6 | 37.0 | 11.6 | 8.6 | 10.2 |
| Settled Density, $Mg(OH)_2$, g./l. | 327 | 364 | 353 | 327 | 132 | 182 | 214 |

EXAMPLE III

The following example was run to demonstrate the correlation between the boron content of the magnesium salt solution and the sizing and settled density of the initially precipitated $Mg(OH)_2$ sludge. A series of runs was made using aqueous solutions containing 69 g. $MgCl_2$/l., 21 g. $CaCl_2$/l., 52 g. NaCl/l. and 18 g. KCl/l. Selected amounts of either borax ($Na_2B_4O_7 \cdot 10H_2O$), boric acid ($H_3BO_3$) or sodium perborate $$(NaBO_2 \cdot H_2O_2 \cdot 3H_2O)$$

as reported in Table 3, were dissolved in 3 liters of each of the solutions. The resulting boron-containing solutions were then reacted with 202 g. of a milled dolime containing 58% CaO and having a fineness modulus of 27. This quantity of dolime was sufficient to react with 96% of the $Mg^{++}$ contained in the solutions. The $Mg(OH)_2$ precipitate was permitted to settle for about 16 hours in the manner described in Example II, and the nearly spent liquor was decanted from the settled sludge and discarded without further treatment for recovery of a second $Mg(OH)_2$ product. The particle size distributions of the precipitates were determined in the same manner as in Example II. The results obtained from these runs and a "control" containing only a trace of boron, are listed in Table 3.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

Table 3

| | Control | Boric Acid | | Sod. Perborate | | Borax | | | |
|---|---|---|---|---|---|---|---|---|---|
| Reacting Solution, mg. B/l | 4.4 | 49.7 | 102.6 | 61.5 | 115.0 | 56.0 | 117.0 | 221.5 | 326.0 |
| Spent Liquor, mg. B/l | 0.0 | 4.2 | 10.3 | 2.0 | 13.7 | 4.8 | 12.2 | 38.8 | 70.0 |
| Sieve Analyses of Sludge, Percent Retained, Cumulative: | | | | | | | | | |
| 28 mesh | 0.6 | 2.1 | 2.5 | 2.3 | 1.9 | 3.0 | 1.8 | 1.9 | 1.7 |
| 32 | 0.7 | 2.9 | 3.7 | 3.3 | 2.8 | 4.1 | 2.6 | 3.7 | 3.7 |
| 48 | 1.9 | 5.6 | 7.9 | 8.0 | 6.9 | 8.5 | 6.5 | 12.4 | 16.0 |
| 65 | 2.5 | 7.5 | 13.3 | 11.7 | 12.7 | 11.2 | 13.4 | 20.3 | 24.5 |
| 100 | 3.3 | 10.1 | 23.8 | 15.0 | 22.5 | 14.5 | 22.8 | 33.1 | 39.2 |
| 150 | 4.0 | 12.5 | 32.5 | 18.1 | 31.1 | 17.6 | 31.1 | 46.1 | 50.2 |
| 200 | 4.7 | 14.8 | 39.9 | 20.8 | 37.3 | 20.1 | 37.9 | 55.8 | 57.6 |
| 325 | 5.9 | 18.0 | 46.8 | 24.4 | 45.0 | 24.3 | 45.2 | 66.1 | 67.8 |
| Fineness Modulus | 3.0 | 9.2 | 21.3 | 13.0 | 20.0 | 12.9 | 20.2 | 29.9 | 32.6 |
| Settled Density, Mg(OH)$_2$ g./l. | 94 | 206 | 253 | 224 | 352 | 206 | 348 | 323 | 295 |

What is claimed is:

1. In the process of producing magnesium hydroxide by the reaction of a magnesium halide-containing solution with a compound selected from the class consisting of quicklime and dolime, the improvement which comprises adding said compound selected from the group consisting of quicklime and dolime in an amount sufficient to react with from about 10% to about 90% of the magnesium values contained in the magnesium halide solution in the presence of a soluble boron salt in amounts sufficient to supply from 20 to 500 milligrams of boron per liter, precipitating a relatively coarse Mg(OH)$_2$ fraction, separating said coarse fraction of Mg(OH)$_2$ sludge from the resultant supernatant magnesium halide solution reduced in both magnesium and boron values, reacting said supernatant magnesium halide solution with an additional quantity of a compound selected from the group consisting of dolime and quicklime in amounts sufficient to precipitate no more than 95 to 99% of the remaining magnesium in said supernatent magnesium halide solution, precipitating a magnesium hydroxide fraction having a finer particle size than the initial fraction of magnesium hydroxide and separating said finer magnesium hydroxide fraction from said mother liquor which is substantially reduced in magnesium values.

2. Process of claim 1 in which the compound selected from the group consisting of quicklime and dolime is initially added in amounts sufficient to react with from about 25% to about 50% of the magnesium values contained in the magnesium solution.

References Cited by the Examiner
UNITED STATES PATENTS

| 2,178,983 | 11/1939 | Wienert | 23—201 |
| 2,215,966 | 9/1940 | Lee et al. | 23—201 |
| 2,227,534 | 1/1941 | Collins | 23—201 |
| 2,703,273 | 3/1955 | Robertson et al. | 23—201 |

MAURICE A. BRINDISI, *Primary Examiner.*